United States Patent [19]

Carter, Jr.

[11] 4,454,261

[45] Jun. 12, 1984

[54] POLYCARBONATE-CALCITE COMPOSITIONS

[75] Inventor: Russell P. Carter, Jr., New Martinsville, W. Va.

[73] Assignee: Mobay Chemical Corporation, Pittsburgh, Pa.

[21] Appl. No.: 358,391

[22] Filed: Mar. 15, 1982

[51] Int. Cl.³ .......................... C08J 5/18; C08K 3/26; C08L 69/00

[52] U.S. Cl. .................... 523/200; 524/425; 524/611; 428/220

[58] Field of Search ................ 523/200, 205; 524/425, 524/611; 428/220

[56] References Cited

U.S. PATENT DOCUMENTS

| | | | |
|---|---|---|---|
| 2,841,504 | 7/1958 | Liggett | 523/200 |
| 3,400,087 | 9/1968 | Robb et al. | 524/425 |
| 3,424,703 | 1/1969 | Jones, Jr. | 524/611 |
| 3,446,765 | 5/1969 | Pryer | 524/425 |
| 3,733,296 | 3/1973 | Cleveland et al. | 524/120 |
| 3,959,192 | 5/1976 | Delfosse et al. | 524/425 |
| 4,073,766 | 2/1978 | Fein et al. | 524/425 |
| 4,120,844 | 10/1978 | Meyer et al. | 524/427 |
| 4,191,670 | 3/1980 | Strauch et al. | 523/200 |

FOREIGN PATENT DOCUMENTS

| | | | |
|---|---|---|---|
| 1014293 | 7/1977 | Canada . | |
| 48-15457 | 5/1973 | Japan | 524/425 |
| 50-146646 | 11/1975 | Japan | 524/425 |
| 52-63947 | 5/1977 | Japan | 523/200 |
| 53-64256 | 6/1978 | Japan | 523/200 |
| 1237164 | 6/1971 | United Kingdom . | |
| 1415746 | 11/1975 | United Kingdom . | |
| 2093042 | 8/1982 | United Kingdom . | |

OTHER PUBLICATIONS

Slip and Antiblock Agent– A Guide to Their Use, H. W. Mock et al., Plastics Technology, Aug. 1974, pp. 41–43.

Slip & Antiblocking Agent– Attaining that Delicate Balance, A. M. Birks– Plastics Technology, Jul. 1977, pp. 131–139.

Does the Slip of Your Web Help or Hurt Its Performance,? R. L. Mueller– Package Engineering, Apr. 1973– p. 61.

U.S. application Ser. No. 270,708 filed Jun. 5, 1981.

U.S. application Ser. No. 339,012.

U.S. application Ser. No. 345,887 filed Feb. 4, 1982.

Polycarbonates, Christopher and Fox, Reinhold Publishing Corp., New York, New York 1962, p. 38.

*Primary Examiner*—Ronald W. Griffin

*Attorney, Agent, or Firm*—Gene Harsh; Lawrence S. Pope; Aron Preis

[57] ABSTRACT

Polycarbonate compositions comprising an aromatic polycarbonate resin wherein dispersed are calcite particulates, are particularly suitable for the preparation of films characterized by their low coefficient of static friction, high light transmission and virtual freedom from haze.

15 Claims, No Drawings

POLYCARBONATE-CALCITE COMPOSITIONS

FIELD OF THE INVENTION

The present invention is directed to polycarbonate compositions and, more particularly, to aromatic polycarbonate-calcite blends.

BRIEF DESCRIPTION OF THE INVENTION

A polycarbonate composition comprising an aromatic thermoplastic polycarbonate resin, wherein dispersed are calcite particulates, was found to be especially suitable for the preparation of films characterized by their low coefficient of static friction, high light transmission and virtual freedom from haze.

DESCRIPTION OF THE PRIOR ART

Polycarbonates derived from reaction involving organic dihydroxy compounds and carbonic acid derivatives have found extensive commercial application because of their excellent mechanical and physical properties. These thermoplastic polymers are particularly suited for the manufacture of molded articles for which impact strength, rigidity, toughness, thermal and dimensional stability as well as excellent electrical properties are required. Furthermore, polycarbonates are eminently suited for casting or extrusion into films which are characteristically of high clarity, color and oxidative stability as well as flame resistant.

One deficiency of polycarbonate-based films has been the high coefficient of static friction, a factor effecting their handling and somewhat restricting their usefulness. It has been the experience of those skilled in the art that the surfaces of films tend to stick when they are made to slide over similar surfaces, a tendency sometimes referred to as "blockiness", due largely to their high coefficient of static friction.

In this connection, see "Slip and Antiblock Agents—A Guide to Their Use", by H. W. Mock et al, Plastics Technology, August 1974, page 41; "Slip and Antiblocking Agents—Attaining that Delicate Balance", by A. M. Birks, Plastics Technology, July 1977, page 131; and "Does the slip of your web help or hurt its performance?", by R. L. Mueller, Package Engineering, April 1973, page 61.

Attempts to lower that friction by chemical modifiers are not entirely satisfactory in that such modifications adversely affect other, desirable properties of the films. U.S. Pat. No. 3,424,703 teaches lowering the coefficient of friction of polycarbonate films by adding small amounts of either silica or talc. One notable disadvantage entailed in the use of silica relates to the limit of about 1 phr that may be incorporated in polycarbonates before processing difficulties are encountered.

The art is noted to disclose the utility of clay, starch and glass particulates as anti-blocking agents for polycarbonates, see Ser. No. 270,708 filed June 5, 1981, now abandoned, Ser. No. 399,012, filed Jan. 12, 1982, now U.S. Pat. No. 4,405,731, issued Sept. 20, 1983, and Ser. No. 345,887 filed Feb. 4, 1982 now abandoned, respectively.

It is thus an object of the present invention to provide a polycarbonate-calcite composition of improved processability suitable for the preparation of films of low static coefficient of friction. It is a further object to provide a polycarbonate-calcite concentrate composition comprising up to about 5 phr of calcite.

DETAILED DESCRIPTION OF THE INVENTION

The polycarbonate resins useful in the practice of the invention are homopolycarbonates, copolycarbonates and terpolycarbonates or mixtures thereof. The polycarbonates generally have molecular weights of 10,000–200,000 (weight average molecular weight) preferably 20,000–80,000, and are additionally characterized by their melt flow of 1–24 gm/10 min. at 300° C. per ASTM D-1238. These polycarbonates may be prepared, for example, by the known diphasic interface process from phosgene and bisphenols by polycondensation (see German OS 2,063,050; 2,063,052; 1,570,703; 2,211,956; 2,211,957 and 2,248,817 and French Pat. No. 1,561,518, and the monograph, H. Schnell, Chemistry and Physics of Polycarbonates, Interscience Publishers, New York, 1964, all incorporated herein by reference).

The aromatic polycarbonates may be based on the following bisphenols: hydroquinone, resorcinol, dihydroxy diphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphoxides, bis-(hydroxyphenyl)-sulphones and $\alpha,\alpha'$-bis-(hydroxyphenyl)-diisopropyl benzenes, as well as the corresponding compounds substituted in the nucleus. These and other suitable aromatic dihydroxy compounds have been described in U.S. Pat. Nos. 3,028,365; 2,999,835; 3,148,172; 2,991,273; 3,271,367; and 2,999,846 and German OS 1,570,703; 2,063,050 and 2,063,052 and in French Pat. No. 1,561,518, all incorporated herein by reference.

Preferred aromatic polycarbonates are those in which 5–100 mol % of the structural units correspond to formula (1):

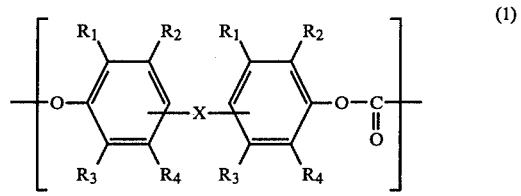

wherein $R_1$, $R_2$, $R_3$ and $R_4 = C_1-C_{10}$ alkyl, Cl, Br, phenyl and H, X=a single bond, —O—, —CO—, S, SO, —SO$_2$, —$C_1-C_{10}$ alkylene, $C_1-C_{10}$ alkylidene, $C_5-C_{15}$ cycloalkylene, $C_5-C_{15}$ cycloalkylidene, $C_7-C_{20}$ cycloalkyl alkylene, $C_6-C_{20}$ cycloalkyl alkylidene or

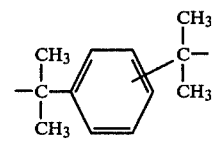

and/or formula (2)

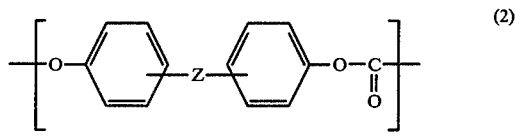

wherein Z=C$_5$-C$_{20}$ alkylene, C$_5$-C$_{20}$ alkylidene, C$_5$-C$_{15}$ cycloalkylene, C$_5$-C$_{15}$ cycloalkylidene, C$_7$-C$_{20}$ cycloalkyl alkylene or C$_6$-C$_{20}$ cycloalkyl alkylidene.

Aromatic polycarbonates containing 5–30 mol % of structural units of formula (1) and/or (2) as well as those containing 50–100 mol % of these structural units are particularly preferred.

Preferred structural units of formula (1) are those of formula (3):

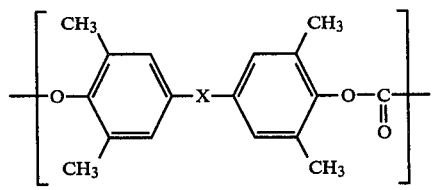

wherein X is as defined above.

The structural units of formula (3) may be based on the following bisphenols, for example: bis-(3,5-dimethyl-4-hydroxyphenyl); bis-(3,5-dimethyl-4-hydroxyphenyl)-ether; bis-(3,5-dimethyl-4-hydroxyphenyl)-carbonyl; bis-(3,5-dimethyl-4-hydroxyphenyl)-sulphone; bis-(3,5-dimethyl-4-hydroxyphenyl)-methane; 1,1-bis-(3,5-dimethyl-4-hydroxyphenyl)-ethane; 1,1-bis-(3,5-dimethyl-4-hydroxyphenyl)-propane; 2,2-bis-(3,5-dimethyl-4-hydroxyphenyl)-butane; 2,4-bis-(3,5-dimethyl-4-hydroxyphenyl)-2-methyl butane; 2,4-bis-(3,5-dimethyl-4-hydroxyphenyl)-butane; 3,3-bis-(3,5-dimethyl-4-hydroxyphenyl)-pentane; 3,3-bis-(3,5-dimethyl-4-hydroxyphenyl)-hexane; 4,4-bis-(3,5-dimethyl-4-hydroxyphenyl)-heptane; 2,2-bis-(3,5-dimethyl-4-hydroxyphenyl)-octane; 2,2-bis-(3,5-dimethyl-4-hydroxyphenyl)-nonane; 2,2-bis-(3,5-dimethyl-4-hydroxyphenyl)-decane; 1,1-bis-(3,5-dimethyl-4-hydroxyphenyl)-cyclohexane; 1,4-bis-(3,5-dimethyl-4-hydroxyphenyl)-cyclohexane; α,α'-bis-(3,5-dimethyl-4-hydroxyphenyl)-p-diisopropyl benzene; and α,α'-bis-(3,5-dimethyl-4-hydroxyphenyl)-m-diisopropyl benzene.

Those structural units of formulae (1) and (2) which are based on the following bisphenols are particularly preferred: bis-(3,5-dimethyl-4-hydroxyphenyl)-methane; 2,2-bis-(3,5-dimethyl-4-hydroxyphenyl)-propane; 2,4-bis-(3,5-dimethyl-4-hydroxyphenyl)-2-methyl butane; 1,1-bis-(3,5-dimethyl-4-hydroxyphenyl)-cyclohexane; α,α'-bis-(3,5-dimethyl-4-hydroxyphenyl)-p-diisopropyl benzene; 2,2-bis-(3,5-dichloro-4-hydroxyphenyl)-propane, 2,2-bis-(3,5-dibromo-4-hydroxypropyl)-propane; 1,1-bis-(4-hydroxyphenyl)-cyclohexane; α,α'-bis-(4-hydroxyphenyl)-m-diisopropyl benzene; α,α'-bis-(4-hydroxyphenyl)-p-diisopropyl benzene; 2,4-bis-(4-hydroxyphenyl)-2-methyl butane; 2,2-bis-(3-methyl-4-hydroxyphenyl)-propane; and 2,2-bis-(3-chloro-4-hydroxyphenyl)-propane.

In addition to containing structural units of formulae (1) and (2), the preferred polycarbonates preferably contain structural units of formula (4):

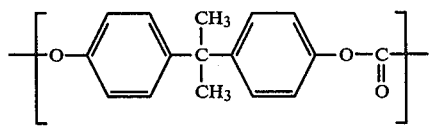

Polycarbonates based solely on the abovementioned o,o,o',o'-tetramethyl-substituted bisphenols are particularly important; in particular, the homopolycarbonate based on 2,2-bis-(3,5-dimethyl-4-hydroxyphenyl)-propane.

Also suitable for the preparation of the polycarbonates of the invention are dihydroxybenzenes of the structural formula:

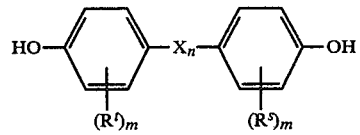

wherein R$^t$ and R$^s$ independently denote C$_1$-C$_{10}$ alkyls, m is an integer of from 0 to 2, X is

or S and n is either 0 or 1.

Among the resins suitable in the practice of the invention are included phenolphthalic-based polycarbonate, copolycarbonates and terpolycarbonates such as are described in U.S. Pat. Nos. 3,036,036 and 4,210,741, both incorporated by reference herein.

In order to obtain special properties, mixtures of various di-(monohydroxyaryl)-alkanes can also be used; thus, mixed polycarbonate resins are obtained. By far the most useful polycarbonate resins are those based on 4,4'-dihydroxydiaryl methanes and, more particularly, bisphenol A [2,2-(4,4'-dihydroxydiphenyl)-propane]. Thus, when flame retardant characteristics are to be imparted to the basic polycarbonate resin, a mixture of bisphenol A and tetrabromobisphenol A [2,2-(3,5,3',5'-tetrabromo-4,4'-dihydroxydiphenyl) -propane] is utilized when reacting with phosgene or a like carbonic acid derivative. Other halogenated phenolic diols are any suitable bis-hydroxyaryl such as the halogenated containing bisphenols such as 2,2'-(3,3,3',5'-tetrachloro-4,4'-dihydroxydiphenyl)-propane; 2,2-(3,5,3',5'-tetrabromo-4,4'-dihydroxydiphenyl)-propane; 2,2-(3,5-dichloro-4,4'-dihydroxydiphenyl)-propane; 2,2-(3,3'-dichloro-5,5'-dimethyl-4,4'-dihydroxyphenyl)-propane; 2,2-(3,3'-dibromo-4,4'-dihydroxydiphenyl)-propane and the like. These halogenated diols are incorporated into the polycarbonates at levels sufficient to impart flame retardant characteristics. For example, a halogen content of about 3 to 10% by weight is normally sufficient.

The polycarbonates of the invention may also be branched by incorporating small quantities of polyhydroxyl compounds in them by condensation, e.g., 0.05–2.0 mol % (based on the quantity of bisphenols used). Polycarbonates of this type have been described, for example, in German OS 1,570,533; 2,116,974 and 2,113,347, British Pat. Nos. 885,442 and 1,079,821 and U.S. Pat. Nos. 3,544,514 and 4,185,009, all incorporated by reference herein. The following are some examples of polyhydroxyl compounds which may be used for this purpose: phloroglucinol; 4,6-dimethyl-2,4,6-tri-(4-hydroxyphenyl)-heptane-2; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenyl-methane; 2,2-bis-[4,4-(4,4'- dihydroxydiphenyl)-cyclohexyl]-propane; 2,4-bis-(4-hydroxyphenyl-4-isopropyl)-phenol; 2,6-bis-(2'-dihydroxy-5'-methylbenzyl)-4-methylphenol; 2,4-dihydroxy-benzoic acid; 2-(4-hydroxyphenyl)-2-(2,4-dihydroxy-phenyl)-propane; 1,4-bis-(4',4''-dihydroxytriphenylmethyl)-benzene and 3,3-bis-(4-hydroxyphenyl)-oxindole.

In addition to the polycondensation process mentioned above and which essentials are described below, other processes for the preparation of the polycarbonates of the invention are polycondensation in a homogeneous phase and transesterification. The suitable processes are disclosed in the incorporated herein by reference U.S. Pat. Nos. 3,028,365; 2,999,846; 3,153,008 and 2,991,273.

The preferred process is the interfacial polycondensation process.

According to the interfacial polycondensation process, copolycarbonate resins are obtained by reacting the aromatic dihydroxy compounds with an alkali metal hydroxide or alkaline earth metal oxide or hydroxide to form the salt of the hydroxy compounds. The salt mixture is present in an aqueous solution or suspension and is reacted with phosgene, carbonyl bromide or bis-chloroformic esters of the aromatic dihydroxy compounds. An organic solvent is provided in the reaction admixture which is a solvent for the polymer but not for the aromatic dihydroxy salts. Thus, chlorinated aliphatic hydrocarbons or chlorinated aromatic hydrocarbons are used as the organic solvent which dissolves the condensation product. In order to limit the molecular weight one may use monofunctional reactants such as monophenols, for example the propyl-, isopropyl- and butyl-phenols, especially p-tert-butylphenol and phenol itself. In order to accelerate the reaction, catalysts such as tertiary amines, quaternary ammonium, phosphonium or arsonium salts and the like may be used. The reaction temperature should be about $-20°$ to $+150°$ C., preferably $0°$ to $100°$ C.

According to the polycondensation process in a homogeneous phase, the dissolved reaction components are polycondensed in an inert solvent in the presence of an equivalent amount of a tertiary amine base required for absorption of the generated HCl, such as, e.g., N,N-dimethyl-aniline; N,N-dimethyl-cyclohexylamine or, preferably, pyridine and the like. In still another process, a diaryl carbonate can be transesterified with the aromatic dihydroxy compounds to form the polycarbonate resin.

It is to be understood that it is possible to combine in the processes described above in a chemically meaningful way both the aromatic dihydroxy compounds and the monohydroxy compounds in the form of the alkali metal salts and/or bis-haloformic acid esters and the amount of phosgene or carbonyl bromide then still required in order to obtain high molecular products. Other methods of synthesis in forming the polycarbonates of the invention such as disclosed in U.S. Pat. No. 3,912,688, incorporated herein by reference, may be used.

Calcites are either synthetic or naturally occurring minerals characterized by their chemical makeup, mostly calcium carbonate, and are widely known and used in a variety of applications.

Calcites useful in the practice of the invention may be surface treated, such as by the application of coupling agents thereon to render improved compatibility with the polycarbonate matrix.

Among the varieties of calcite suitable in the context of the present invention are limestone, marble and chalk, all having a substantially similar chemical makeup comprising of calcium carbonate. Regardless of its source, the calcite useful in the present context is of particulate form and may be characterized in terms of its average particle size or its specific area, i.e., surface area per unit of weight. The calcite suitable in the practice of the invention may have an average particle size between about 0.5 and about 10 microns, preferably between about 0.5 to about 8 microns, more preferably between about 0.6 to about 5 microns. Alternatively, the suitable calcite may be characterized as having less than 12 meter$^2$/gm, preferably between about 1.5 and about 11 meter$^2$/gm of specific area.

To the extent that the calcite, once admixed with the polycarbonate may, under suitable conditions, tend to react with the resin, care should be taken to either coat the calcite particulates with any of suitable agents (for instance, stearic acid) or select a calcite having a balance between its average particle size and specific surface. By way of a demonstration, the changes in the melt flow of certain compositions of polycarbonate and calcite as a function of the average particle size of the calcite were monitored and are reported below:

| Average Particle Size (microns) | Surface Area m$^2$/gm | Melt Flow (gm/10 min) Initial | Final |
|---|---|---|---|
| <0.1 | >12 | 21.3 | 31.3 |
| 5 | ~1.9 | 11.9 | 12.7 |
| Control, no calcite | — | 9.0 | 9.1 |

The compositions tested in the experiments described above all contained 0.1% by weight calcite. A sizable drop in the melt flow indicates an adverse effect on the integrity of the resin.

Typical among the calcites useful in the present context is a precipitated calcium carbonate available in commerce under the trade name Day/Cal from Harrison Enterprises of Dayton, Ohio. A representative chemical analysis of Day/Cal corresponds to

| | Percent by weight |
|---|---|
| CaCO$_3$ (dry basis) | 97.89 |
| MgCO$_3$ | 0.95 |
| SiO$_2$ | 0.36 |
| Al$_2$O$_3$ | 0.17 |
| Fe$_2$O$_3$ | 0.25 |
| CaSO$_4$ | 0.33 |
| H$_2$O loss at 110° C. | 0.30 |

Further characterized, Day/Cal ranges in particle size from about 0.08 to about 3.65 microns (average 0.68 microns) and is noted in that its particles which are finer than 2 microns in size constitute 98% of its weight.

Other calcites such as are described and characterized in terms of particle size and specific surface below were also found suitable in the practice in accordance with the invention.

| Material | Average Particle Size (microns) | Specific Surface m$^2$/gm |
|---|---|---|
| G-White[1] | 5.5 | 1.9 |
| H-White[1] | 2.5 | 2.5 |
| Q-White[1] | 0.9 | 10.7 |
| Hi-pflex[2] 100 | 0.3 | 3.5 |

-continued

| Material | Average Particle Size (microns) | Specific Surface m²/gm |
|---|---|---|
| Hi-pflex[2] 200 | 0.7 | 6.0 |

[1]from Calcium Carbonate Corporation, Division of Huber Inc. of Quincy, Illinois.
[2]from Pfizer Chemicals, New York, New York.

The compositions of the invention may incorporated from about 0.025 to about 5 phr calcite and be thus particularly suitable as concentrates to be diluted by admixing with polycarbonate resin to a predetermined loading.

Further, the polycarbonate compositions of the invention may incorporate 0.025 phr to about 1.0 phr, preferably 0.025 to about 0.1 phr, of calcite and be thus particularly suitable for the preparation of films which are characterized by their low static coefficient of friction. In any case, care should be taken to minimize the amount of moisture in both the resin and the calcite. The amount of moisture should not, in any case, be in excess of 2.0%, preferably 0.5%.

Although the results tabulated below, wherein summarized are test results indicative of the inventive concept, are believed clear, the following notes are offered by way of further elucidation.

The results reported in the tables were obtained upon testing of the solution cast films and as is well known in the art, these results are indicative of trends to be expected upon the evaluation of extruded films. It should further be noted that the values of the coefficient of friction thus obtained are significantly higher than the values obtainable upon testing the corresponding extruded films. Accordingly, $\mu s$ and $\mu k$ are, respectively, the static and kinetic coefficients of friction as measured per ASTM D-1894-78. The symbols O-O, O-I and I-I are significant in identifying the surface of the sample tested. The films whose properties are reported below were all cast from solution onto glass and the "air side" of the film is designated as O while the glass side is designated I. The "torture test" is conducted on a 3 ounce injection molding machine at a temperature of 725° F. and molding cycles of one minute and is designed to test the thermal stability of a resinous composition. A skilled operator may determine by evaluating the parts molded under the processing parameters above, whether the composition suffers thermal degradation, for instance, upon the incorporation of additives thereto. A subjective evaluation indicative of the sufficiency of thermal stability is reported in the table below.

Measurements of melt flow were carried out as an added criteria indicating structural or chemical changes that may occur upon the incorporation of the calcite additive. An abnormal change in flow, which may indicate depolymerization or cross-linking, may point to processing difficulties which can be expected upon the extruding of the compound into films. Surprisingly, the calcites used in the present invention appear to bring about a degree of improved thermal stability to the calcite-polycarbonate system.

The compositions of polycarbonate-calcite of the invention are prepared by blending a polycarbonate resin with a predetermined amount of suitable calcite to provide a homogeneous dispersion thereof in the resin. Such blending may be carried out in any of suitable blenders or mixers commonly used in the art. The preparation of films by the solution casting method, extrusion and by blow molding techniques are described in the monograph, "Chemistry and Physics of Polycarbonates", H. Schnell, Interscience Publishers, 1964, and in "Polycarbonates" by Christopher and Fox, Reinhold Publishing Corporation, 1962, both incorporated by reference herein. The compositions of the instant invention are suitable for the preparation of thin films (less than 10 mils) of excellent clarity and low static coefficient of friction.

The polycarbonate resin used in the course of the experiments is HMS 3119, a branched polycarbonate resin of 1.29–1.30 relative viscosity (measured on 0.5% solution in methylene chloride) and having a melt flow rate of 1.5–2.5 g/10 min. per ASTM-D 1238 and is a product of Mobay Chemical Corporation. The coefficient of static friction (O-O) of HMS 3119 is about 10.0. The haze and light transmission values of HMS 3119 are 0.4% and 91.9%, respectively. The thickness of the films which properties are tabulated below was 1 mil.

TABLE 1

| Amount of calcite[1] (phr) | 0.1 | 0.3 | 0.7 | 1.4 | 0.9 | 1.0 |
|---|---|---|---|---|---|---|
| Polycarbonate resin[2] | A | A | A | B | B | C |
| % Haze[3] | 0.4 | 0.8 | 1.6 | 3.9 | 1.7 | — |
| % Transmission[3] | 91.3 | 91.0 | 91.5 | 91.6 | 91.7 | — |
| Coefficient of Friction | | | | | | |
| O-O $\mu s$ | 5.28 | 0.772 | 0.569 | 0.584 | 0.548 | .868 |
| $\mu k$ | 0.761 | 0.660 | 0.533 | 0.660 | 0.609 | .736 |
| O-I $\mu s$ | 4.77 | 5.28 | 0.533 | 0.487 | 0.675 | 0.475 |
| $\mu k$ | 0.508 | 0.66 | 0.482 | 0.482 | 0.609 | 0.599 |
| I-I $\mu s$ | 5.08 | 0.736 | 0.660 | 0.838 | 0.761 | 2.53 |
| $\mu k$ | — | 0.838 | 1.02 | 0.746 | 0.761 | 1.37 |

[1]Day/Cal, precipitated calcium carbonate
[2]A denotes Merlon M-40, a polycarbonate resin having a melt flow 6–11.9, B denotes HMS-3119 a branched polycarbonate described above and C denotes Merlon M-50, a polycarbonate resin having a melt flow of 3.0–5.9, all products of Mobay Chemical Corporation
[3]Per ASTM D-1003-61

In an additional set of experiments, surface treated (stearic acid) calcite (Day/Cal) was incorporated at a level of 1.0 phr in Merlon HMS 3119 and the film produced compared to those made of a similar composition except for said surface treatment. The melt flow of the first (treated calcite) was 4.1 and that for the second was 9.7. The results of the torture test were comparable and satisfactory. No significant differences in terms of the coefficient of friction could be attributed to the difference in compositional makeup. Both compositions performed well upon a torture test.

What is claimed is:

1. A thin clear film of less than 10 mil in its thickness comprising
   (i) an aromatic thermoplastic polycarbonate resin, and
   (ii) between 0.025 to 5 phr of calcite having an average particle size of about 0.5 to about 10 microns.

2. The thin film of claim 1, wherein said calcite is surface treated with stearic acid.

3. The thin film of claim 1 or 2, wherein said (ii) is between 0.025 and 1 phr.

4. The thin film of claim 1 or 2, wherein said particle size is about 0.6 to about 5 microns.

5. The thin film of claim 1, wherein said calcite is treated with a coupling agent.

6. The thin film of claim 1 or 5, wherein said (i) is a bisphenol-A based polycarbonate.

7. In the solution cast process for the preparation of clear films thinner than 10 mils, the improvement comprising using a polycarbonate composition comprising (i) an aromatic thermoplastic polycarbonate resin, and (ii) between 0.025 to 5 phr of calcite having an average particle size of about 0.5 to about 10 microns.

8. The process of claim 7, wherein said calcite is surface treated with stearic acid.

9. The process of claim 7, wherein said calcite is treated with a coupling agent.

10. In the extrusion process for the preparation of clear films thinner than 10 mils, the improvement comprising using a polycarbonate composition comprising (i) an aromatic thermoplastic polycarbonate resin, and (ii) between 0.025 to 5 phr of calcite having an average particle size of about 0.5 to about 10 microns.

11. The process of claim 10, wherein said calcite is surface treated with stearic acid.

12. The process of claim 10, wherein said calcite is treated with a coupling agent.

13. In the blow molding process for the preparation of clear films thinner than 10 mils, the improvement comprising using a polycarbonate composition comprising (i) an aromatic thermoplastic polycarbonate resin, and (ii) between 0.025 to 5 phr of calcite having an average particle size of about 0.5 to about 10 microns.

14. The process of claim 13, wherein said calcite is surface treated with stearic acid.

15. The process of claim 13, wherein said calcite is treated with a coupling agent.

* * * * *